US010863055B2

(12) United States Patent
Sako

(10) Patent No.: US 10,863,055 B2
(45) Date of Patent: Dec. 8, 2020

(54) PRINTING APPARATUS, CONTROL METHOD FOR PRINTING APPARATUS, AND STORAGE MEDIUM

(71) Applicant: CANON KABUSHIKI KAISHA, Tokyo (JP)

(72) Inventor: Ritsuto Sako, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/819,307

(22) Filed: Nov. 21, 2017

(65) Prior Publication Data

US 2018/0152592 A1  May 31, 2018

(30) Foreign Application Priority Data

Nov. 29, 2016 (JP) ................................ 2016-230832

(51) Int. Cl.
*G06F 3/12* (2006.01)
*H04N 1/333* (2006.01)
*H04W 8/00* (2009.01)
*H04N 1/00* (2006.01)
*H04W 4/80* (2018.01)
*H04W 76/00* (2018.01)

(52) U.S. Cl.
CPC ..... *H04N 1/33346* (2013.01); *H04N 1/00307* (2013.01); *H04W 8/005* (2013.01); *H04N 2201/0094* (2013.01); *H04W 4/80* (2018.02); *H04W 76/00* (2013.01)

(58) Field of Classification Search
CPC ........... H04N 1/33346; H04N 1/00307; H04N 2201/0094

USPC ......................................................... 358/1.15
See application file for complete search history.

(56) References Cited

U.S. PATENT DOCUMENTS

| | | | |
|---|---|---|---|
| 9,727,291 B1* | 8/2017 | Skinner | G06F 3/1292 |
| 2003/0023767 A1* | 1/2003 | Brabson | G06F 9/544 |
| | | | 719/313 |
| 2006/0265644 A1* | 11/2006 | Koizumi | G06F 3/1204 |
| | | | 715/209 |
| 2012/0257561 A1* | 10/2012 | Redding | H04L 12/1827 |
| | | | 370/312 |
| 2014/0126010 A1* | 5/2014 | Rocas | G06F 3/01 |
| | | | 358/1.15 |
| 2015/0256404 A1 | 9/2015 | Evans | |
| 2015/0281875 A1* | 10/2015 | Shin | H04W 76/36 |
| | | | 455/41.2 |
| 2016/0241726 A1* | 8/2016 | Okamura | H04N 1/00307 |

(Continued)

FOREIGN PATENT DOCUMENTS

| | | |
|---|---|---|
| JP | 2015-208087 A | 11/2015 |
| JP | 2016-152538 A | 8/2016 |

(Continued)

OTHER PUBLICATIONS https://mbsworks.com/wp-content/uploads/2017/02/Konica-Minolta-Mobile-Printing-Guide.pdf (Year: 2017).*

(Continued)

*Primary Examiner* — Huo Long Chen
(74) *Attorney, Agent, or Firm* — Canon U.S.A., Inc., IP Division

(57) ABSTRACT

In a case where a setting of a function is changed from enabled to disabled, a printing apparatus stops transmission of a Bluetooth Low Energy packet in a format compatible with the function.

15 Claims, 9 Drawing Sheets

(56) References Cited

U.S. PATENT DOCUMENTS

| | | | | |
|---|---|---|---|---|
| 2016/0241728 | A1* | 8/2016 | Naruse | H04N 1/00347 |
| 2016/0253133 | A1* | 9/2016 | Ohhashi | G06F 3/1236 |
| | | | | 358/1.15 |
| 2017/0075635 | A1* | 3/2017 | Maemura | H04N 1/00244 |
| 2017/0127379 | A1* | 5/2017 | Mayuzumi | G01S 3/801 |
| 2017/0136791 | A1* | 5/2017 | Zhan | B41J 29/06 |
| 2017/0310849 | A1* | 10/2017 | Hosoda | H04N 1/32791 |
| 2018/0070407 | A1* | 3/2018 | Ohhira | H04W 12/06 |
| 2018/0124138 | A1* | 5/2018 | Kamthe | H04W 4/80 |
| 2018/0124847 | A1* | 5/2018 | Nishida | H04W 76/14 |

FOREIGN PATENT DOCUMENTS

| | | | | |
|---|---|---|---|---|
| JP | 2016-170608 | A | 9/2016 | |
| WO | 2015/042065 | A1 | 3/2015 | |
| WO | WO-2016004578 | A1 * | 1/2016 | B41J 29/06 |
| WO | 2016/047064 | A1 | 3/2016 | |

OTHER PUBLICATIONS

Bluetooth Specification Version 4.0 [vol. 3],11 Advertising and Scan Response Data Format, Jun. 30, 2010, pp. 375-378.

Apple, Inc., Getting Started with IBeacon, Version 1.0, 11 pages, Jun. 2, 2014.

* cited by examiner

FIG.2

| Header | Connection Information | Server or Resource Path | Port | IP Address | TX Power |

FIG.5

| Header | TX Power | MAC Address | Device Name | Device Category |

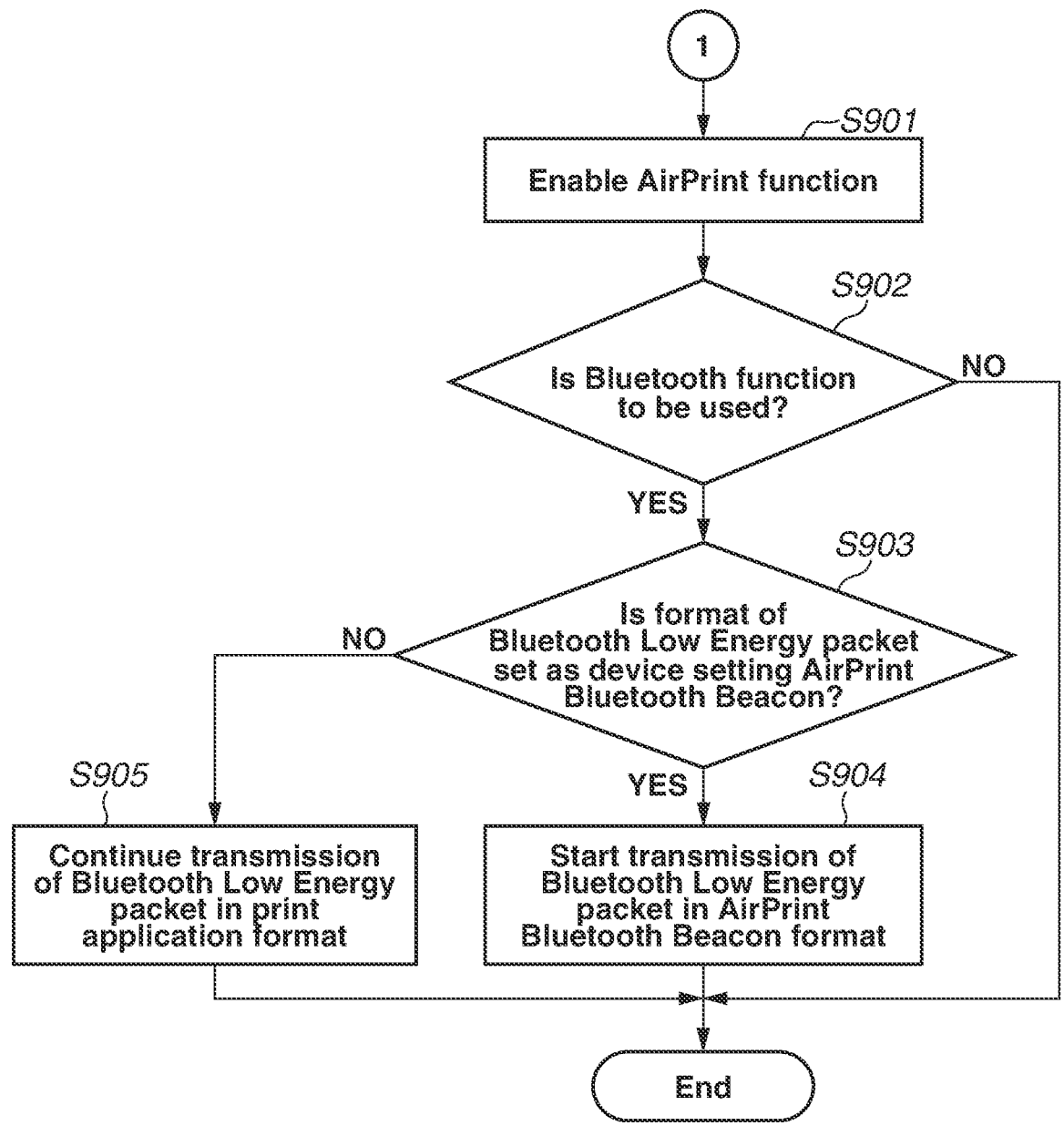

PRINTING APPARATUS, CONTROL METHOD FOR PRINTING APPARATUS, AND STORAGE MEDIUM

BACKGROUND OF THE INVENTION

Field of the Invention

The present invention relates to a printing apparatus that transmits an advertising packet.

Description of the Related Art

In recent years, an increasing number of printing apparatuses (e.g., multifunction peripherals and printers) have been provided with a Bluetooth (registered trademark) Low Energy function. A printing apparatus having the Bluetooth Low Energy function transmits data to an external apparatus such as a mobile terminal by using a Bluetooth Low Energy advertising packet (referred to as a "Bluetooth Low Energy packet" in the following description). Japanese Patent Application Laid-Open No. 2016-152538 discusses a configuration in which a mobile terminal searches for printing apparatuses by using Bluetooth Low Energy and transmits print data to a printing apparatus selected by a user from among the search results.

Companies define their own formats for Bluetooth Low Energy packets. For example, Apple Inc. defines AirPrint Bluetooth Beacon. AirPrint Bluetooth Beacon is used in AirPrint (registered trademark). A printing apparatus supporting AirPrint transmits a Bluetooth Low Energy packet in the AirPrint Bluetooth Beacon format. Similarly, a mobile terminal supporting AirPrint searches for a device by using a Bluetooth Low Energy packet in the AirPrint Bluetooth Beacon format.

Japanese Patent Application Laid-Open No. 2016-152538 discusses a configuration in which a mobile terminal searches for printing apparatuses by using Bluetooth Low Energy and transmits print data to a printing apparatus selected by a user from among the search results.

Companies define formats for Bluetooth Low Energy packets on the assumption that a mobile terminal receiving a Bluetooth Low Energy packet utilizes the Bluetooth Low Energy packet for a particular function. For example, in the case of the aforementioned AirPrint Bluetooth Beacon, it is assumed that the mobile terminal utilizes the Bluetooth Low Energy packet for the AirPrint function. A case is assumed where, in a situation where a printing apparatus is transmitting a Bluetooth Low Energy packet in a particular format compatible with a particular function, the printing apparatus stops using the particular function. In this case, if the printing apparatus continues the transmission of the Bluetooth Low Energy packet in the particular format compatible with the particular function that the printing apparatus has stopped using, a mobile terminal results in receiving the Bluetooth Low Energy packet that cannot be utilized by the printing apparatus.

SUMMARY OF THE INVENTION

According to an aspect of the present invention, a printing apparatus configured to execute wireless communication includes a memory device that stores a set of instructions, and at least one processor that executes the instructions to set whether a function of the printing apparatus is to be enabled or disabled, transmit a Bluetooth Low Energy advertising packet in a format used to execute the function, and, in a case where the setting of the function is changed from enabled to disabled, perform control to stop the transmission of the Bluetooth Low Energy advertising packet in the format used to execute the function.

Further features of the present invention will become apparent from the following description of exemplary embodiments with reference to the attached drawings.

BRIEF DESCRIPTION OF THE DRAWINGS

FIG. 2 is a diagram illustrating a format of a Bluetooth Low Energy (BLE) packet.

FIG. 5 is a diagram illustrating a format of a Bluetooth Low Energy packet.

FIG. 9 is a flowchart illustrating the processing executed by the printing apparatus.

DESCRIPTION OF THE EMBODIMENTS

Exemplary embodiments of the present invention will be described below with reference to the drawings. The following exemplary embodiments do not limit the invention according to the appended claims, and not all the combinations of the features described in the exemplary embodiments are essential for a solution according to the invention.

Figure 1:
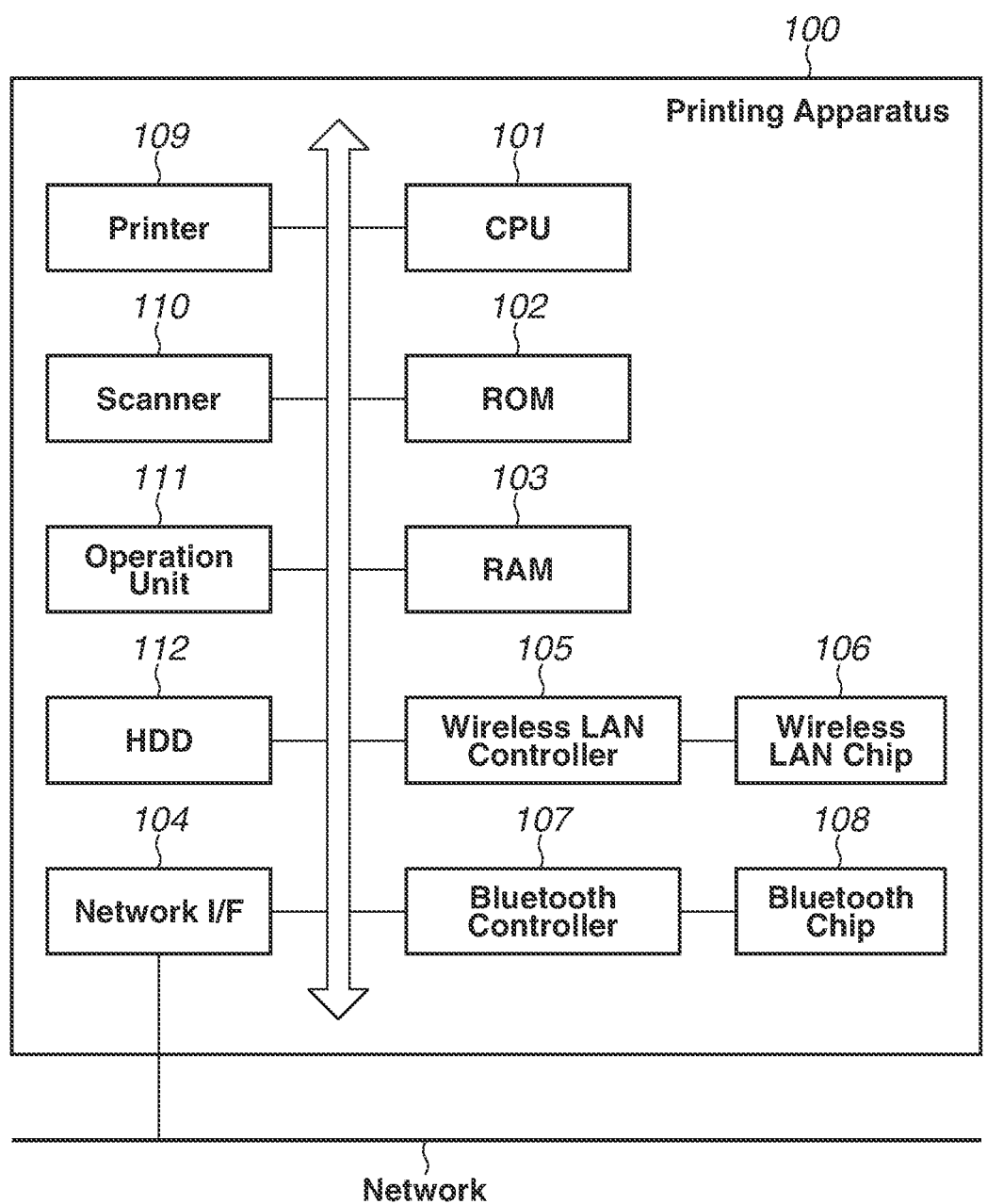
FIG. 1 is a diagram illustrating a hardware configuration of a printing apparatus.

First, with reference to FIG. 1, a hardware configuration of a printing apparatus 100 is described. A central processing unit (CPU) 101 reads a control program stored in a read-only memory (ROM) 102 and executes various processes for controlling the operation of the printing apparatus 100. The ROM 102 stores the control program. A random-access memory (RAM) 103 is used as a temporary storage area such as a main memory or a work area for the CPU 101. A hard disk drive (HDD) 112 is a non-volatile storage medium for storing various pieces of data. In the printing apparatus 100 according to a first exemplary embodiment, the single CPU 101 executes the processes illustrated in a flowchart described below. Alternatively, another form may be employed. For example, a plurality of CPUs can cooperate to execute the processes illustrated in the flowchart described below. Further, some of the processes in the flowchart described below may be executed using a hardware circuit such as an application-specific integrated circuit (ASIC). The CPU 101 serves as a setting means for setting whether a function of the printing apparatus 100 is to be enabled or disabled. The CPU 101 further serves as a control means for, in a case where the setting of the function is changed from enabled to disabled by the setting means, performing control to stop the transmission of the Bluetooth Low Energy advertising packet in the format used to execute the function.

A printer 109 executes a printing process on a sheet based on print data received from an external apparatus by a wireless local area network (LAN) chip 106 or a network interface (I/F) 104. A scanner 110 reads a document placed by a user, thereby generating a document image. The document image generated by the scanner 110 is printed by the printer 109 (a copying process) or accumulated in the HDD 112. An operation unit 111 includes a display having a touch panel function and a keyboard and displays various operation screens. The user can input an instruction and information to the printing apparatus 100 via the operation unit 111.

The wireless LAN chip 106 is a chip for executing wireless LAN communication using the Institute of Electrical and Electronics Engineers (IEEE) 802.11a/b/g/n/ac. A wireless LAN controller 105 controls wireless LAN communication performed by the wireless LAN chip 106.

A Bluetooth chip 108 is a wireless communication chip for performing wireless communication using Bluetooth (registered trademark). Further, the Bluetooth chip 108 also has a Bluetooth Low Energy (BLE) function and executes Bluetooth Low Energy communication. The Bluetooth Low Energy communication refers to broadcasting Bluetooth Low Energy advertising packets in a predetermined cycle. A Bluetooth controller 107 controls Bluetooth communication performed by the Bluetooth chip 108. The Bluetooth chip 108 serves as a communication means for transmitting a Bluetooth Low Energy advertising packet in a format used to execute the function.

The network I/F 104 is connected to a network by a LAN cable. The network I/F 104 communicates with an external apparatus (e.g., a personal computer (PC)) on the network, and receives print data from the external apparatus or transmits a document image generated by the scanner 110 to the external apparatus.

Figure 3:
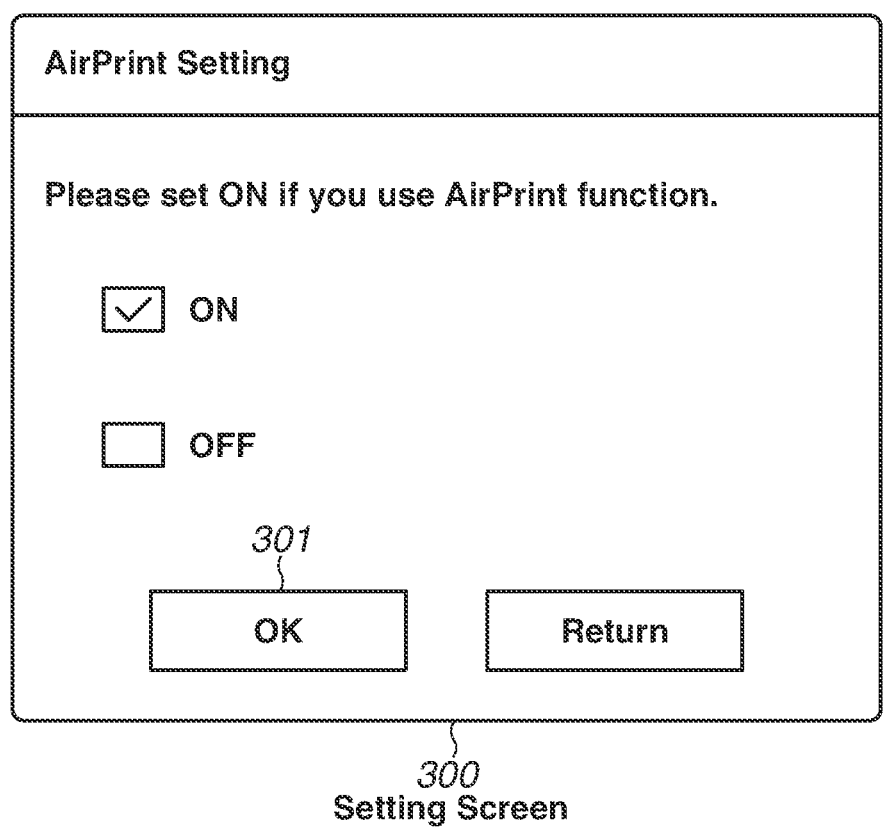
FIG. 3 is a diagram illustrating a setting screen.

The printing apparatus 100 transmits an advertising packet in an AirPrint Bluetooth Beacon format. In the following description, a Bluetooth Low Energy advertising packet will be referred to as a "Bluetooth Low Energy packet". FIG. 2 illustrates the format of AirPrint Bluetooth Beacon. The AirPrint Bluetooth Beacon format is a format defined by Apple Inc. and is defined so that data of connection information, a path, a port number, an Internet Protocol (IP) address, and transmission radio wave intensity is stored. A Bluetooth Low Energy packet in the AirPrint Bluetooth Beacon format is used by a PC or a mobile terminal compatible with AirPrint. The PC or the mobile terminal searches for a device using the Bluetooth Low Energy packet in the AirPrint Bluetooth Beacon format. In other words, based on AirPrint Bluetooth Beacon, a wireless communication terminal such as a PC or a mobile terminal identifies a device compatible with an AirPrint function. The AirPrint Bluetooth Beacon format can include the IP address of the printing apparatus 100. Using the IP address included in the Bluetooth Low Energy packet in the AirPrint Bluetooth Beacon format, the wireless communication terminal establishes communication with the printing apparatus 100 based on a communication protocol different from Bluetooth Low Energy. Then, the printing apparatus 100 receives a print instruction through this communication. In other words, from an external apparatus having detected the printing apparatus 100 based on a Bluetooth Low Energy advertising packet, the printing apparatus 100 receives a print instruction through wireless communication different from Bluetooth Low Energy communication. For example, the wireless communication terminal can perform wireless LAN (e.g., Wi-Fi) communication with the printing apparatus 100 using the IP address included in the Bluetooth Low Energy packet. The printing apparatus 100 has an AirPrint function. A setting screen 300 in FIG. 3 is a screen displayed on the operation unit 111 of the printing apparatus 100 and is a screen via which the user sets whether the AirPrint function is to be enabled or disabled. The AirPrint function is a function in which the printing apparatus 100 executes a printing process based on a print instruction received from predetermined software (e.g., an operation system) of an external apparatus such as a PC or a mobile terminal. Using the AirPrint function, the external apparatus can give a print instruction without requiring a printer driver of each printing apparatus present on the network. The AirPrint function is an example of a particular function of the print apparatus that can be enabled or disabled.

To enable the AirPrint function of the printing apparatus 100, the user selects "ON" on the setting screen 300. If the AirPrint function is enabled, the printing apparatus 100 responds to a search packet for searching for an AirPrint-compatible device, or executes a printing process based on an AirPrint print job. On the other hand, to disable the AirPrint function of the printing apparatus 100, the user selects "OFF" on the setting screen 300. If the AirPrint function is disabled, even if the printing apparatus 100 receives a search packet for searching for an AirPrint-compatible device, the printing apparatus 100 does not respond to the search packet. Further, if the AirPrint function is disabled, the printing apparatus 100 does not execute a printing process even if the printing apparatus 100 receives an AirPrint print job. If the user presses an OK button 301, the printing apparatus 100 stores the result of the setting made via the setting screen 300 in the HDD 112.

Figure 4:
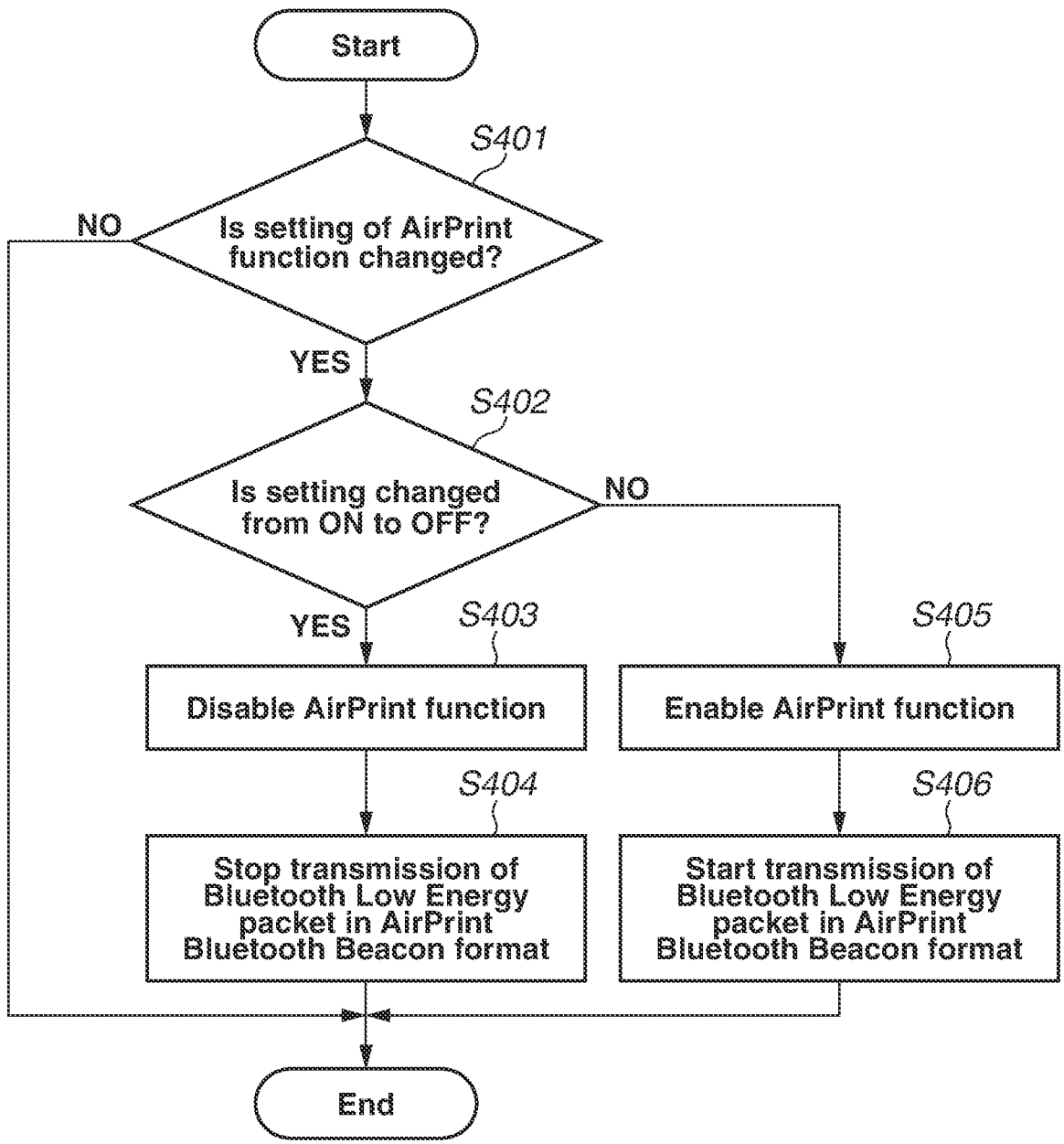
FIG. 4 is a flowchart illustrating processing executed by the printing apparatus.

Next, with reference to a flowchart of FIG. 4, a description is given of processing executed by the printing apparatus 100 when the setting of the AirPrint function is changed in the printing apparatus 100. Steps illustrated in the flowchart of FIG. 4 are processed by the CPU 101 loading a control program stored in the ROM 102 into the RAM 103 and executing the control program. The processing illustrated in the flowchart of FIG. 4 is executed when the user presses the OK button 301 on the setting screen 300.

First, in step S401, the CPU 101 determines whether the setting of the AirPrint function is changed. If the CPU 101 determines in step S401 that the setting of the AirPrint function is not changed (NO in step S401), the processing illustrated in the flowchart of FIG. 4 ends. If, on the other hand, the CPU 101 determines in step S401 that the setting of the AirPrint function is changed (YES in step S401), the processing proceeds to step S402.

Next, in step S402, the CPU 101 determines whether the setting of the AirPrint function is changed from ON to OFF. If the CPU 101 determines that the setting of the AirPrint function is changed from ON to OFF (YES in step S402), the processing proceeds to step S403. If, on the other hand, the CPU 101 determines that the setting of the AirPrint function is not changed from ON to OFF, i.e., is changed from OFF to ON (NO in step S402), the processing proceeds to step S405.

Next, step S403 is described. In step S403, the CPU 101 disables the AirPrint function.

Next, in step S404, the CPU 101 stops the transmission of a Bluetooth Low Energy packet in the AirPrint Bluetooth Beacon format described with reference to FIG. 2. The CPU 101 instructs the Bluetooth controller 107 to stop the transmission of a Bluetooth Low Energy packet in the AirPrint Bluetooth Beacon format. Then, the Bluetooth controller 107 controls the Bluetooth chip 108 to stop the transmission of a Bluetooth Low Energy packet in the AirPrint Bluetooth Beacon format. The Bluetooth chip 108 stops the transmission of a Bluetooth Low Energy packet in the AirPrint Bluetooth Beacon format.

With the process of step S404, the printing apparatus 100 automatically stops the transmission of a Bluetooth Low Energy packet in the AirPrint Bluetooth Beacon format according to the AirPrint function being disabled. The AirPrint function being disabled in the printing apparatus 100 means that a mobile terminal cannot use the printing apparatus 100 with AirPrint. In this state, even if the printing apparatus 100 continues the transmission of a Bluetooth Low Energy packet in the AirPrint Bluetooth Beacon format, the mobile terminal results in finding the printing apparatus 100 that cannot be used with AirPrint. In response, the present exemplary embodiment is characterized in that the printing apparatus 100 automatically stops the transmission of a Bluetooth Low Energy packet in the AirPrint Bluetooth Beacon format according to the AirPrint function being disabled. Consequently, it is possible to prevent the printing apparatus 100 from wastefully transmitting a Bluetooth Low Energy packet in the AirPrint Bluetooth Beacon format even though the AirPrint function is disabled.

Next, step S405 is described. In step S405, the CPU 101 enables the AirPrint function.

Next, in step S406, the CPU 101 starts the transmission of a Bluetooth Low Energy packet in the AirPrint Bluetooth Beacon format. The CPU 101 instructs the Bluetooth controller 107 to transmit a Bluetooth Low Energy packet in the AirPrint Bluetooth Beacon format. Then, the Bluetooth controller 107 controls the Bluetooth chip 108 to transmit a Bluetooth Low Energy packet in the AirPrint Bluetooth Beacon format. The Bluetooth chip 108 transmits Bluetooth Low Energy packets in the AirPrint Bluetooth Beacon format in a predetermined cycle (e.g., at 100-msec intervals).

With the process of step S406, the printing apparatus 100 automatically starts the transmission of a Bluetooth Low Energy packet in the AirPrint Bluetooth Beacon format according to the AirPrint function being enabled. The user does not need to separately input to the printing apparatus 100 the operation of enabling the AirPrint function of the printing apparatus 100 and the operation of starting the transmission of a Bluetooth Low Energy packet in the AirPrint Bluetooth Beacon format. This improves convenience for the user.

Next, a second exemplary embodiment is described. The hardware configuration of the printing apparatus 100 according to the present exemplary embodiment is similar to the configuration described with reference to FIG. 1.

The printing apparatus 100 according to the present exemplary embodiment can transmit Bluetooth Low Energy packets in a plurality of formats. The plurality of formats are the AirPrint Bluetooth Beacon format described with reference to FIG. 2 and a print application format. FIG. 5 illustrates the format of a print application. The print application format is a format defined by the manufacturer of the printing apparatus 100 and is defined so that transmission radio wave intensity, a media access control (MAC) address, a device name, and a device category are stored. The manufacturer of the printing apparatus 100 provides a print application for a mobile terminal. The user installs this print application in a mobile terminal and uses a print function of the printing apparatus 100. An advertising packet in the print application format is used by a mobile terminal in which the print application provided by the manufacturer of the printing apparatus 100 is installed. Based on an advertising packet in the print application format, a wireless communication terminal such as a PC or a mobile terminal identifies a device compatible with the print application. The print application format can include the MAC address of the printing apparatus 100. Using the IP address and the MAC address included in the advertising packet in the print application format, the wireless communication terminal establishes communication with the printing apparatus 100 based on a communication protocol different from Bluetooth Low Energy. For example, the wireless communication terminal can perform Wi-Fi communication with the printing apparatus 100 using the IP address and the MAC address included in the advertising packet.

Figure 6:
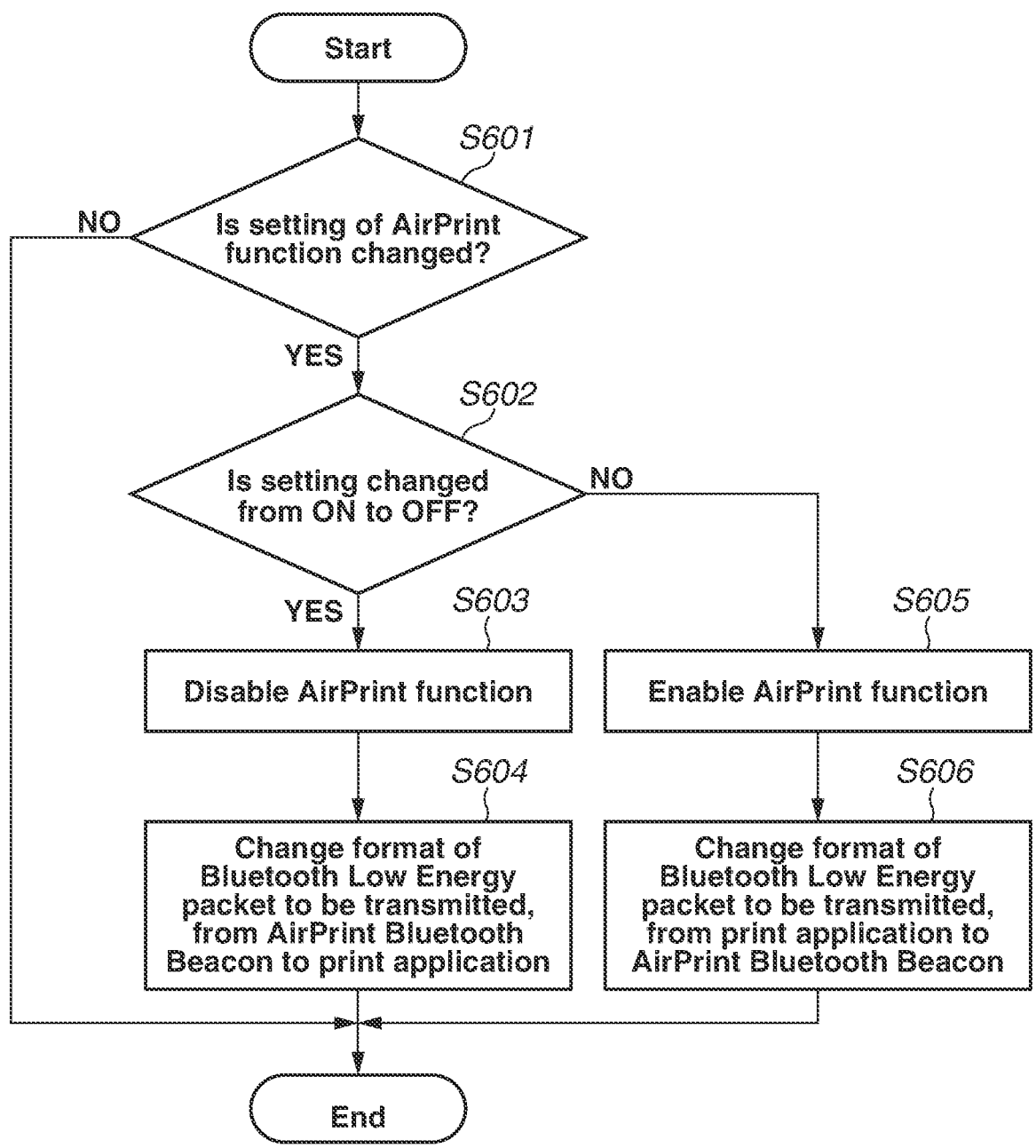
FIG. 6 is a flowchart illustrating processing executed by a printing apparatus.

Next, with reference to a flowchart of FIG. 6, a description is given of processing executed by the printing apparatus 100 when the setting of the AirPrint function is changed in the printing apparatus 100. Steps illustrated in the flowchart of FIG. 6 are processed by the CPU 101 loading a control program stored in the ROM 102 into the RAM 103 and executing the control program. The processing illustrated in the flowchart of FIG. 6 is executed when the user presses the OK button 301 on the setting screen 300.

First, in step S601, the CPU 101 determines whether the setting of the AirPrint function is changed. If the CPU 101 determines in step S601 that the setting of the AirPrint function is not changed (NO in step S601), the processing illustrated in the flowchart of FIG. 6 ends. If, on the other hand, the CPU 101 determines in step S601 that the setting of the AirPrint function is changed (YES in step S601), the processing proceeds to step S602.

Next, in step S602, the CPU 101 determines whether the setting of the AirPrint function is changed from ON to OFF. If the CPU 101 determines that the setting of the AirPrint function is changed from ON to OFF (YES in step S602), the processing proceeds to step S603. If, on the other hand, the CPU 101 determines that the setting of the AirPrint function is not changed from ON to OFF, i.e., is changed from OFF to ON (NO in step S602), the processing proceeds to step S605.

Next, step S603 is described. In step S603, the CPU 101 disables the AirPrint function.

Next, in step S604, the CPU 101 changes the format of a Bluetooth Low Energy packet to be transmitted, from the AirPrint Bluetooth Beacon format to the print application format. The CPU 101 instructs the Bluetooth controller 107 to change the format of a Bluetooth Low Energy packet to be transmitted, to the print application format. Under control of the Bluetooth controller 107, first, the Bluetooth chip 108 stops the transmission of a Bluetooth Low Energy packet in the AirPrint Bluetooth Beacon format. Then, next, the Bluetooth chip 108 transmits Bluetooth Low Energy packets in the print application format in a predetermined cycle (e.g., at 30-msec intervals). With the process of step S604, the printing apparatus 100 can automatically stop the transmission of a Bluetooth Low Energy packet in the AirPrint Bluetooth Beacon format according to the AirPrint function being disabled. Further, the printing apparatus 100 can automatically start the transmission of a Bluetooth Low Energy packet in the print application format according to the AirPrint function being disabled.

Next, step S605 is described. In step S605, the CPU 101 enables the AirPrint function.

Next, in step S606, the CPU 101 changes the format of a Bluetooth Low Energy packet to be transmitted, from the print application format to the AirPrint Bluetooth Beacon format. The CPU 101 instructs the Bluetooth controller 107 to change the format of a Bluetooth Low Energy packet to be transmitted, to the AirPrint Bluetooth Beacon format. Under control of the Bluetooth controller 107, first, the Bluetooth chip 108 stops the transmission of a Bluetooth Low Energy packet in the print application format. Then, next, the Bluetooth chip 108 transmits Bluetooth Low Energy packets in the AirPrint Bluetooth Beacon format in a predetermined cycle (e.g., at 100-msec intervals). With the process of step S606, the printing apparatus 100 can automatically stop the transmission of a Bluetooth Low Energy packet in the print application format according to the AirPrint function being enabled. Further, the printing apparatus 100 can automatically start the transmission of a Bluetooth Low Energy packet in the AirPrint Bluetooth Beacon format according to the AirPrint function being enabled.

Next, a third exemplary embodiment is described. The hardware configuration of the printing apparatus 100 according to the present exemplary embodiment is similar to the configuration described with reference to FIG. 1. In the present exemplary embodiment, which of the AirPrint Bluetooth Beacon format described with reference to FIG. 2 and the print application format described with reference to FIG. 5 a Bluetooth Low Energy packet is to be used for transmission is set as a device setting of the printing apparatus 100.

Figure 7:
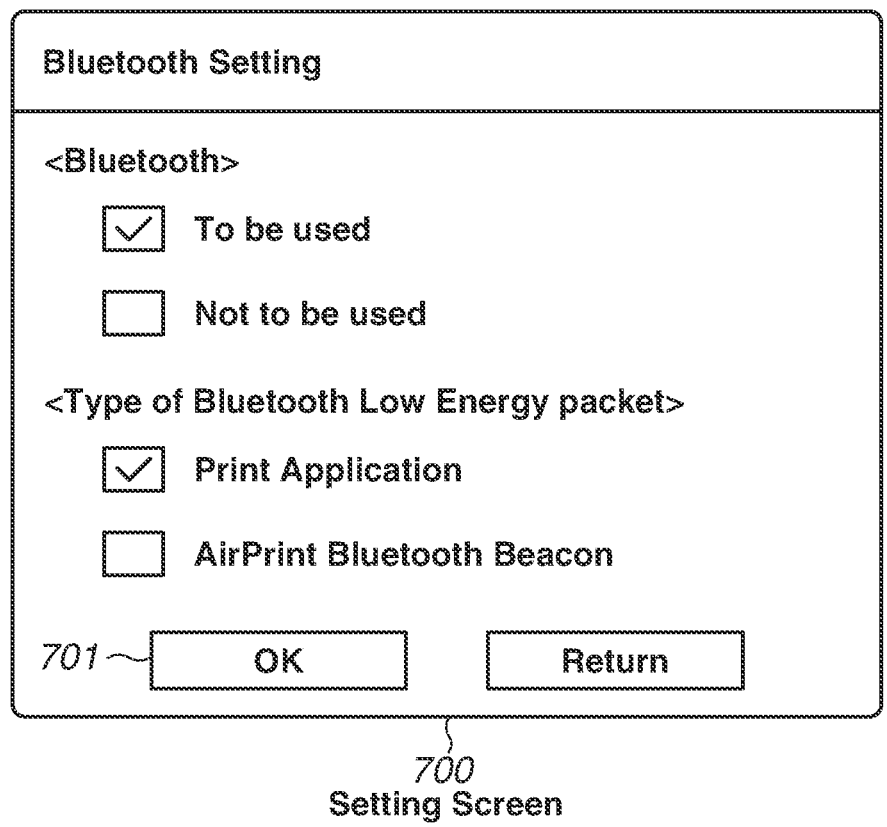
FIG. 7 is a diagram illustrating a setting screen.

A setting screen 700 illustrated in FIG. 7 is a screen displayed on the operation unit 111 of the printing apparatus 100. Via the setting screen 700, the user can set whether a Bluetooth function is to be used. Further, via the setting screen 700, the user can set the format of a Bluetooth Low Energy packet to be transmitted.

More specifically, it is possible to set whether an advertising packet in a format used to execute the AirPrint function is to be transmitted. Further, it is possible to set whether an advertising packet in a format used to execute a different print function different from the AirPrint function is to be transmitted. In the present exemplary embodiment, an example is described where it is only possible to select either of the format used for the AirPrint function and the format used for the different print function.

If the user presses an OK button 701, the printing apparatus 100 stores the results of the settings made via the setting screen 700, as device settings in the HDD 112.

If a setting is made so that the Bluetooth function is "not to be used", the printing apparatus 100 does not transmit a Bluetooth Low Energy packet. If, on the other hand, a setting is made so that the Bluetooth function is "to be used", the printing apparatus 100 transmits either of a Bluetooth Low Energy packet in the print application format and a Bluetooth Low Energy packet in the AirPrint Bluetooth Beacon format.

Further, if "print application" is set as the format of a Bluetooth Low Energy packet to be transmitted, the printing apparatus 100 transmits a Bluetooth Low Energy packet in the print application format. The transmission of a Bluetooth Low Energy packet in the print application format is executed regardless of the setting of the AirPrint function. If, on the other hand, "AirPrint Bluetooth Beacon" is set as the format of a Bluetooth Low Energy packet to be transmitted, the printing apparatus 100 transmits a Bluetooth Low Energy packet in the AirPrint Bluetooth Beacon format. If the setting of the AirPrint function is OFF, the transmission of a Bluetooth Low Energy packet in the AirPrint Bluetooth Beacon format is stopped. If the setting of the AirPrint function is ON, the transmission of a Bluetooth Low Energy packet in the AirPrint Bluetooth Beacon format is started.

Figure 8:
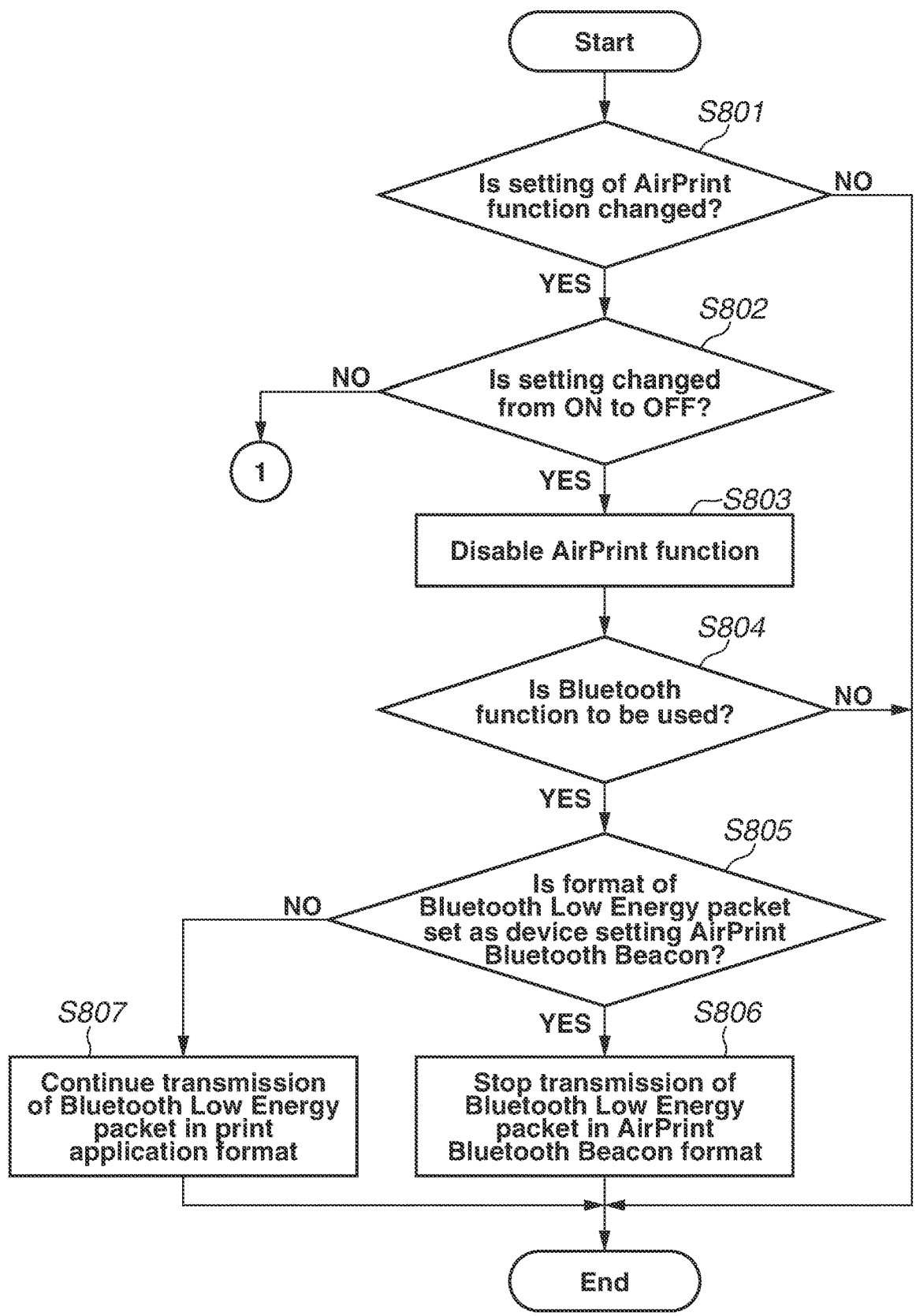
FIG. 8 is a flowchart illustrating processing executed by a printing apparatus.

Next, with reference to flowcharts of FIGS. 8 and 9, processing executed by the printing apparatus 100 when the setting of the AirPrint function is changed in the printing apparatus 100 is described. Steps illustrated in the flowcharts of FIGS. 8 and 9 are processed by the CPU 101 loading a control program stored in the ROM 102 into the RAM 103 and executing the control program. The processing illustrated in the flowchart of FIG. 8 is executed when the user presses the OK button 701 on the setting screen 700.

First, in step S801, the CPU 101 determines whether the setting of the AirPrint function is changed. If the CPU 101 determines in step S801 that the setting of the AirPrint function is not changed (NO in step S801), the processing illustrated in the flowchart of FIG. 8 ends. If, on the other hand, the CPU 101 determines in step S801 that the setting of the AirPrint function is changed (YES in step S801), the processing proceeds to step S802.

Next, in step S802, the CPU 101 determines whether the setting of the AirPrint function is changed from ON to OFF. If the CPU 101 determines that the setting of the AirPrint function is changed from ON to OFF (YES in step S802), the processing proceeds to step S803. If, on the other hand, the CPU 101 determines that the setting of the AirPrint function is not changed from ON to OFF, i.e., is changed from OFF to ON (NO in step S802), the processing proceeds to step S901 in FIG. 9.

Next, step S803 is described. In step S803, the CPU 101 disables the AirPrint function.

Next, in step S804, the CPU 101 determines whether the Bluetooth function is to be used. This determination is achieved by referencing the result of the setting made via the setting screen 700, which is stored in the HDD 112. If the setting is made so that the Bluetooth function is to be used (YES in step S804), the processing proceeds to step S805. If, on the other hand, the setting is made so that the Bluetooth function is not to be used (NO in step S804), the processing illustrated in the flowchart of FIG. 8 ends. If the setting is made so that the Bluetooth function is not to be used, the printing apparatus 100 does not transmit a Bluetooth Low Energy packet. Thus, if the setting is made so that the Bluetooth function is not to be used, the process of starting or stopping the transmission of a Bluetooth Low Energy packet in the AirPrint Bluetooth Beacon format described below is not executed.

Next, step S805 is described. In step S805, the CPU 101 identifies the format of a Bluetooth Low Energy packet set as the device setting. This process is achieved by referencing the result of the setting made via the setting screen 700, which is stored in the HDD 112. If the format of a Bluetooth Low Energy packet set as the device setting is the AirPrint Bluetooth Beacon format (YES in step S805), the processing proceeds to step S806. If, on the other hand, the format of a Bluetooth Low Energy packet set as the device setting is the print application format (NO in step S805), the processing proceeds to step S807.

Next, step S806 is described. In step S806, the CPU 101 stops the transmission of a Bluetooth Low Energy packet in the AirPrint Bluetooth Beacon format. The CPU 101 instructs the Bluetooth controller 107 to stop the transmission of a Bluetooth Low Energy packet in the AirPrint Bluetooth Beacon format. Then, the Bluetooth controller 107 controls the Bluetooth chip 108 to stop the transmission of a Bluetooth Low Energy packet in the AirPrint Bluetooth Beacon format. The Bluetooth chip 108 stops the transmission of a Bluetooth Low Energy packet in the AirPrint Bluetooth Beacon format. If the device setting indicates the AirPrint Bluetooth Beacon format, and the AirPrint function is enabled, the printing apparatus 100 transmits a Bluetooth Low Energy packet in the AirPrint Bluetooth Beacon format. With the process of step S806, the printing apparatus 100 can automatically stop the transmission of a Bluetooth Low Energy packet in the AirPrint Bluetooth Beacon format according to the AirPrint function being disabled. More specifically, in a case where the setting of the AirPrint function is changed from enabled to disabled in the state where a setting is made so that an advertising packet in the format used to execute the AirPrint function is to be transmitted, the CPU 101 executes the following process. The CPU 101 performs control to stop the transmission of an advertising packet in the format used to execute the AirPrint function.

Next, step S807 is described. In step S807, the CPU 101 determines that the transmission of a Bluetooth Low Energy packet in the print application format is to be continued. A Bluetooth Low Energy packet in the print application format is transmitted regardless of the setting of the AirPrint function. Thus, if the device setting indicates the print application format, the printing apparatus 100 does not stop the transmission of a Bluetooth Low Energy packet in the print application format even if the setting of the AirPrint function is changed from ON to OFF.

Next, step S901 in FIG. 9 is described. The process of step S901 is executed in a case where the CPU 101 determines in step S802 in FIG. 8 that the setting of the AirPrint function is not changed from ON to OFF, i.e., is changed from OFF to ON (NO in step S802). In step S901, the CPU 101 enables the AirPrint function.

Next, in step S902, the CPU 101 determines whether the Bluetooth function is to be used. This determination is achieved by referencing the result of the setting made via the setting screen 700, which is stored in the HDD 112. If the setting is made so that the Bluetooth function is to be used (YES in step S902), the processing proceeds to step S903. If, on the other hand, the setting is made so that the Bluetooth function is not to be used (NO in step S902), the processing illustrated in the flowchart of FIG. 9 ends.

Next, step S903 is described. In step S903, the CPU 101 identifies the format of a Bluetooth Low Energy packet set as the device setting. This process is achieved by referencing the result of the setting made via the setting screen 700, which is stored in the HDD 112. If the format of a Bluetooth Low Energy packet set as the device setting is the AirPrint Bluetooth Beacon format (YES in step S903), the processing proceeds to step S904. If, on the other hand, the format of a Bluetooth Low Energy packet set as the device setting is the print application format (NO in step S903), the processing proceeds to step S905.

Next, step S904 is described. In step S904, the CPU 101 starts the transmission of a Bluetooth Low Energy packet in the AirPrint Bluetooth Beacon format. The CPU 101 instructs the Bluetooth controller 107 to start the transmission of a Bluetooth Low Energy packet in the AirPrint Bluetooth Beacon format. Then, the Bluetooth controller 107 controls the Bluetooth chip 108 to start the transmission of a Bluetooth Low Energy packet in the AirPrint Bluetooth Beacon format. The Bluetooth chip 108 starts the transmission of a Bluetooth Low Energy packet in the AirPrint Bluetooth Beacon format. If the device setting indicates the AirPrint Bluetooth Beacon format, and the AirPrint function is disabled, the printing apparatus 100 stops the transmission of a Bluetooth Low Energy packet in the AirPrint Bluetooth Beacon format. With the process of step S904, the printing apparatus 100 can automatically start the transmission of a Bluetooth Low Energy packet in the AirPrint Bluetooth Beacon format according to the AirPrint function being enabled.

Next, step S905 is described. In step S905, the CPU 101 determines that the transmission of a Bluetooth Low Energy packet in the print application format is to be continued. If the device setting indicates the print application format, the printing apparatus 100 does not change the format of a Bluetooth Low Energy packet to be transmitted to the AirPrint Bluetooth Beacon format even if the setting of the AirPrint function is changed from OFF to ON.

In the above exemplary embodiments, a description has been given of the process of automatically stopping the transmission of a Bluetooth Low Energy packet in the AirPrint Bluetooth Beacon format according to the AirPrint function being disabled. This process, however, can be changed as follows. If the AirPrint function is disabled, the printing apparatus 100 confirms with the user whether the transmission of a Bluetooth Low Energy packet in the AirPrint Bluetooth Beacon format is to be stopped. Then, under the condition that the user agrees to stop the transmission, the printing apparatus 100 stops the transmission of a Bluetooth Low Energy packet in the AirPrint Bluetooth Beacon format.

Further, in the above exemplary embodiments, a description has been given of the process of automatically starting the transmission of a Bluetooth Low Energy packet in the AirPrint Bluetooth Beacon format according to the AirPrint function being enabled. This process, however, can be changed as follows. If the AirPrint function is enabled, the printing apparatus 100 confirms with the user whether the transmission of a Bluetooth Low Energy packet in the AirPrint Bluetooth Beacon format is to be started. Then, under the condition that the user agrees to start the transmission, the printing apparatus 100 starts the transmission of a Bluetooth Low Energy packet in the AirPrint Bluetooth Beacon format.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-230832, filed Nov. 29, 2016, which is hereby incorporated by reference herein in its entirety.

What is claimed is:

1. A printing apparatus configured to execute wireless communication, the printing apparatus comprising:
a communication interface capable of transmitting a Bluetooth Low Energy advertising packet;
at least one memory device that stores a set of instructions; and
at least one processor that executes the instructions, the instructions, when executed, causing the information processing apparatus to perform operations comprising:
set whether a predetermined print function of the printing apparatus is to be enabled or disabled as a device setting based on a user operation, wherein the predetermined print function is a function of receiving a print job from predetermined software of an external apparatus and executing a print process;
control the communication interface to transmit the Bluetooth Low Energy advertising packet in a format corresponding to the predetermined print function, in a case where the setting of the predetermined function is enabled;
according to switching of the setting of the predetermined print function from enabled to disabled, control the communication interface to stop the transmission of the advertising packet in the format corresponding to the predetermined print function, wherein a module of the communication interface that provides a service related to Bluetooth Low Energy is not stopped even after the advertising packet in the format corresponding to the predetermined print function is stopped,
wherein in a case where the setting of the predetermined print function is disabled, printing using the predetermined software is not executed; and
set whether the Bluetooth Low Energy advertising packet in the format corresponding to the predetermined print function is to be transmitted is set as a second device setting based on a user operation, and
according to switching of the setting of the predetermined print function from disabled to enabled in a case where not transmitting the advertising packet in the format corresponding to the predetermined print function is set as the second device setting, automatically changing the second device setting to transmitting the advertising packet in the format corresponding to the predetermined print function,
wherein the device setting is not changed to disabled in response to a change in the second device setting to not transmitting the Bluetooth Low Energy advertising packet in the format corresponding to the predetermined print function, and
wherein in a case where the predetermined print function is enabled, it is possible to receive a print job from the predetermined software through wireless communication different from Bluetooth Low Energy and execute a print process, regardless of whether the advertising packet in the format corresponding to the predetermined print function has been transmitted or not.

2. The printing apparatus according to claim 1, wherein the at least one processor executes the instructions to receive, through wireless communication different from Bluetooth Low Energy, a print job from the predetermined software having detected the printing apparatus using the received Bluetooth Low Energy advertising packet in the format corresponding to the predetermined print function transmitted by the printing apparatus.

3. A control method for a printing apparatus configured to execute wireless communication, the control method comprising:
transmitting a Bluetooth Low Energy advertising packet from a communication interface;
setting whether a predetermined print function of the printing apparatus is to be enabled or disabled as a device setting based on a user operation, wherein the predetermined print function is a function of receiving a print job from predetermined software of an external apparatus;
controlling the communication interface to transmit the Bluetooth Low Energy advertising packet in a format corresponding to the predetermined print function, in a case where the setting of the predetermined print function is enabled;
according to switching of the settings of the predetermined print function from enabled to disabled, controlling the communication interface to stop the transmission of the advertising packet in the format corresponding to the predetermined print function, wherein a module of the communication interface that provides a service related to Bluetooth Low Energy is not stopped even after the advertising packet in the format corresponding to the predetermined print function is stopped,
wherein in a case where the setting of the predetermined print function is disabled, printing using the predetermined software is not executed; and
setting whether the Bluetooth Low Energy advertising packet in the format corresponding to the predetermined print function is to be transmitted is set as a second device setting based on a user operation, and
according to switching of the setting of the predetermined print function from disabled to enabled in a case where not transmitting the advertising packet in the format corresponding to the predetermined print function is set as the second device setting, automatically changing the second device setting to transmitting the advertising packet in the format corresponding to the predetermined print function,
wherein the device setting is not changed to disabled in response to a change in the second device setting to not transmitting the Bluetooth Low Energy advertising packet in the format corresponding to the predetermined print function, and
wherein in a case where the predetermined print function is enabled, it is possible to receive a print job from the predetermined software through wireless communication different from Bluetooth Low Energy and execute a print process, regardless of whether the advertising packet in the format corresponding to the predetermined print function has been transmitted or not.

4. The control method according to claim 3, wherein,
in a case where the setting of the predetermined print function is disabled and where a Bluetooth Low Energy advertising packet in a different format different from the format corresponding to the predetermined print function is transmitted, in response to a change in the setting of the predetermined print function from disabled to enabled, a format of a Bluetooth Low Energy advertising packet to be transmitted is changed from the different format to the format corresponding to the predetermined print function.

5. The control method according to claim 4, wherein the different format is a format corresponding to a print application different from the predetermined software installed in an external apparatus.

6. The control method according to claim 3, wherein the printing apparatus receives, through wireless communication different from Bluetooth Low Energy, a print job from the predetermined software having detected the printing apparatus using the received Bluetooth Low Energy advertising packet in the format corresponding to the predetermined print function transmitted by the printing apparatus.

7. The control method according to claim 3,
wherein the predetermined print function is AirPrint function.

8. The control method according to claim 7,
wherein the format corresponding to the predetermined print function is an AirPrint Bluetooth Beacon format.

9. The control method according to claim 3, further comprising setting, based on a user operation and as a third device setting, whether a Bluetooth Low Energy advertising packet in a second format that is different from the format corresponding to the predetermined print function and corresponds to a print application different from the predetermined software installed in an external apparatus is to be transmitted.

10. The control method according to claim 9,
wherein, in a case where it is set that the Bluetooth Low Energy advertising packet in the second format is to be transmitted as the third device setting, the transmission of the Bluetooth Low Energy advertising packet in the second format is continued even in a case where there is a change in the setting of the predetermined print function from enabled to disabled in accordance with the first device setting.

11. The control method according to claim 3, wherein the predetermined format is an AirPrint Bluetooth Beacon format, and the Bluetooth Low Energy advertising packet in the format corresponding to the predetermined print function includes at least information indicating a port number used for receiving print data and information indicating an Internet Protocol (IP) address.

12. The control method according to claim 3, wherein the first device setting is not changed to disabled in response to a change in the second device setting to not transmitting the Bluetooth Low Energy advertising packet in the format corresponding to the predetermined print function.

13. The control method according to claim 3,
wherein receiving the print job in a predetermined format and then performing printing is permitted in a case where the predetermined print function is enabled, and receiving print job in the predetermined format and then performing printing is prohibited in a case where the predetermined print function is disabled.

14. A non-transitory computer-readable storage medium storing a program for causing a computer to perform a method for a printing apparatus to execute wireless communication, the method comprising:
transmitting a Bluetooth Low Energy advertising packet from a communication interface;
setting whether a predetermined print function of the printing apparatus is to be enabled or disabled as a device setting based on a user operation, wherein the predetermined print function is a function of receiving a print job from predetermined software of an external apparatus;
controlling the communication interface to transmit the Bluetooth Low Energy advertising packet in a format corresponding to the predetermined print function, in a case where the setting of the predetermined print function is enabled;
according to switching of the settings of the predetermined print function from enabled to disabled, controlling the communication interface to stop the transmission of the advertising packet in the format corresponding to the predetermined print function, wherein a module of the communication interface that provides a service related to Bluetooth Low Energy is not stopped even after the advertising packet in the format corresponding to the predetermined print function is stopped,
wherein in a case where the setting of the predetermined print function is disabled, printing using the predetermined software is not executed; and
setting whether the Bluetooth Low Energy advertising packet in the format corresponding to the predetermined print function is to be transmitted is set as a second device setting based on a user operation, and
according to switching of the setting of the predetermined print function from disabled to enabled in a case where not transmitting the advertising packet in the format corresponding to the predetermined print function is set as the second device setting, automatically changing the second device setting to transmitting the advertising packet in the format corresponding to the predetermined print function,
wherein the device setting is not changed to disabled in response to a change in the second device setting to not transmitting the Bluetooth Low Energy advertising packet in the format corresponding to the predetermined print function, and
wherein in a case where the predetermined print function is enabled, it is possible to receive a print job from the predetermined software through wireless communication different from Bluetooth Low Energy and execute a print process, regardless of whether the advertising packet in the format corresponding to the predetermined print function has been transmitted or not.

15. The non-transitory computer-readable storage medium according to claim 14, wherein the printing apparatus receives, through wireless communication different from Bluetooth Low Energy, a print job from the predetermined software having detected the printing apparatus using the received Bluetooth Low Energy advertising packet in the format corresponding to the predetermined print function transmitted by the printing apparatus.

* * * * *